US 8,987,999 B2

(12) United States Patent
Zhang et al.

(10) Patent No.: US 8,987,999 B2
(45) Date of Patent: Mar. 24, 2015

(54) LED DRIVER

(71) Applicant: Delta Electronics, Inc., Taoyuan Hsien (TW)

(72) Inventors: Xinghua Zhang, Taoyuan Hsien (TW); Linwei Chen, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 13/937,652

(22) Filed: Jul. 9, 2013

(65) Prior Publication Data

US 2014/0239829 A1 Aug. 28, 2014

(30) Foreign Application Priority Data

Feb. 27, 2013 (CN) .......................... 2013 1 0061677

(51) Int. Cl.
*H05B 41/36* (2006.01)
*H02M 1/00* (2006.01)
*H05B 33/08* (2006.01)
*H02M 3/335* (2006.01)

(52) U.S. Cl.
CPC ........... *H05B 33/0815* (2013.01); *H02M 3/335* (2013.01); *H02M 2001/0006* (2013.01); *H02M 2001/0032* (2013.01)
USPC ...... 315/276; 315/119; 363/21.12; 363/21.04; 363/21.08; 363/123

(58) Field of Classification Search
CPC ................................. H02M 1/00; H05B 41/36
USPC .............. 315/119, 276; 363/78, 21.12, 21.16, 363/21.04, 21.08, 123
See application file for complete search history.

(56) References Cited

U.S. PATENT DOCUMENTS

| | | | | |
|---|---|---|---|---|
| 5,515,256 A * | 5/1996 | Yokoyama | ...................... | 363/18 |
| 5,852,550 A * | 12/1998 | Majid et al. | ................ | 363/21.05 |
| 5,995,385 A * | 11/1999 | Shimamura | ................ | 363/21.16 |
| 7,894,212 B2 * | 2/2011 | Nishikawa | ....................... | 363/16 |
| 8,339,055 B2 * | 12/2012 | Zhan et al. | ..................... | 315/219 |
| 2002/0125837 A1* | 9/2002 | Noda et al. | ..................... | 315/225 |
| 2003/0048645 A1* | 3/2003 | Hosotani et al. | ........... | 363/21.12 |
| 2005/0093518 A1* | 5/2005 | Chu et al. | ....................... | 320/166 |
| 2011/0019445 A1* | 1/2011 | Wu et al. | ......................... | 363/78 |
| 2011/0175532 A1* | 7/2011 | Peng | ............................. | 315/119 |
| 2012/0314458 A1* | 12/2012 | Hosotani | .................... | 363/21.09 |

* cited by examiner

*Primary Examiner* — Douglas W Owens
*Assistant Examiner* — Wei Chan
(74) *Attorney, Agent, or Firm* — Lowe Hauptman & Ham, LLP

(57) ABSTRACT

The present application discloses a LED driver including: a first and a second auxiliary windings connected in series with each other; a first rectifying device coupled with a terminal of the first auxiliary winding while the other terminal is coupled with the second auxiliary winding; a second rectifying device coupled with a terminal of the second auxiliary winding; a first voltage regulator coupled with the first rectifying device; an unidirectional conducting device having a positive and a negative terminals; and a DC output terminal coupled with the negative terminal of the unidirectional conducting device and configured to provide required DC electricity to a control circuit in the LED driver. The LED driver can guarantee that Vcc voltages provided under a heavy or light load state can always meet the DC power supplying requirements of respective control devices in the driver and meanwhile losses can be reduced.

9 Claims, 8 Drawing Sheets

US 8,987,999 B2

LED DRIVER

CROSS REFERENCE TO RELATED APPLICATIONS

The present application claims priority under 35 U.S.C. §119 to Chinese Patent Application No. 201310061677.1, filed on Feb. 27, 2013, the entire content of which is incorporated herein by reference.

TECHNICAL FIELD

The present application relates to power supply driving technologies, in particular to a Light Emitting Diode (LED) driver.

BACKGROUND

In existing LED drivers, auxiliary direct current (Vcc) power supplying circuits are generally used to provide required Direct Current (DC) electricity to control devices. For example, such Vcc auxiliary power supplying may be achieved by rectification after coupling an auxiliary winding which is configured by a transformer with a secondary side winding in the driver. Such method is simple in implementation and cheap in cost, and is preferably applicable in circuits structured in flyback type.

FIG. 8 illustratively shows a schematic diagram of a LED driver having a Vcc auxiliary power supplying circuit in conventional technologies. The LED driver 1 includes a primary power section 11, a secondary power section 12 and a transformer T1. The transformer T1 includes a primary side winding W11 and a secondary side winding W12 which serve as an input winding and an output winding of the transformer T1, respectively. The primary power section 11 provides required input voltages for the transformer, and the secondary power section 12 processes the voltage outputted from the secondary side winding W12 to be voltage suitable for driving LED devices 5.

The transformer further includes an auxiliary winding W13 which provides required DC electricity for respective control devices in the LED driver 1 after rectification of a diode D11. The DC electricity is outputted through a DC output terminal 13. A capacitor C11 plays a role of filtering.

In the LED driver 1 shown in FIG. 8, dotted terminals of the auxiliary winding W13 and the secondary side winding W12 are consistent with each other. Assuming that a turns ratio of the auxiliary winding W13 to the secondary side winding W12 is n, a voltage after rectification of the diode D11 is n times of the output voltage of the secondary side winding W12.

A constant current is usually required in LED drivers, and thus the output voltages differ greatly between a heavy load state and a light load state. Since the dotted terminals of the auxiliary winding W13 and the secondary side winding W12 are consistent with each other, the output DC voltages provided by the auxiliary winding W13 also differ greatly. If the DC voltage provided by the auxiliary winding W13 becomes lower, it may result that the provided Vcc voltage cannot meet the DC power supplying requirements of respective control devices in the driver. If it is intended to ensure that the provided Vcc voltage can always meet the DC power supplying requirements of respective control devices in the driver, losses will be increased.

SUMMARY OF THE INVENTION

Aiming at resolving the problems existing in the conventional technologies, a LED driver is provided to guarantee that Vcc voltages provided under a heavy load state and a light load state can always meet the DC power supplying requirements of respective control devices in the driver and meanwhile losses can be reduced.

An embodiment of the present application provides a LED driver comprising:

a transformer comprising a primary side winding and a secondary side winding, the secondary side winding being configured to be electrically coupled with a LED device;

the LED driver further comprising:

a first auxiliary winding and a second auxiliary winding which are connected in series with each other and have their dotted terminals being consistent with a dotted terminal of the primary side winding or the secondary side winding;

a first rectifying device electrically coupled with a terminal of the first auxiliary winding while the other terminal of the first auxiliary winding is electrically coupled with the second auxiliary winding;

a second rectifying device electrically coupled with a terminal of the second auxiliary winding which is electrically coupled with the first auxiliary winding;

a first voltage regulator electrically coupled with the first rectifying device and configured to adjust a voltage of an electrical signal rectified by the first rectifying device;

an unidirectional conducting device having a positive terminal electrically coupled with the first voltage regulator and a negative terminal electrically coupled with the second rectifying device; and a Direct Current (DC) output terminal electrically coupled with the negative terminal of the unidirectional conducting device and configured to provide required DC electricity to a control circuit in the LED driver.

In the LED driver of the present application, the dotted terminals of the two serial-connected auxiliary windings are consistent with the dotted terminal of the primary side winding or the secondary side winding, and a voltage regulator is added to control a rectified voltage after the first auxiliary winding.

If the dotted terminals of the two serial-connected auxiliary windings are consistent with the dotted terminal of the primary side winding, by setting a turns ratio of the first auxiliary winding to the primary side winding and a turns ratio of the second auxiliary winding to the primary side winding, the unidirectional conducting device may be turned on or off under different input voltage conditions so as to make electricity be supplied by the first auxiliary winding only or by the two auxiliary windings together under different input voltage conditions. Thus, the Vcc voltage provided under different input voltage conditions can always meet the DC power supplying requirements of respective control devices in the driver and meanwhile the losses can be reduced. Furthermore, the two serial-connected auxiliary winding are less influenced by the secondary side winding because the dotted terminals of the two serial-connected auxiliary windings are consistent with the dotted terminal of the primary side winding, and thus the provided Vcc voltage can always meet the DC power supplying requirements of respective control devices in the driver regardless of whether the output side is in a heavy load state or a light load state.

If the dotted terminals of the two serial-connected auxiliary windings are consistent with the dotted terminal of the secondary side winding, by setting a turns ratio of the first auxiliary winding to the secondary side winding and a turns ratio of the second auxiliary winding to the secondary side winding, the unidirectional conducting device may be turned on or off under different output voltage conditions (i.e., different load conditions) so as to make electricity be supplied by the first auxiliary winding only or by the two auxiliary windings together under different output voltage conditions. Thus, it can be guaranteed that the Vcc voltages provided under different output voltage conditions can always meet the DC power supplying requirements of respective control devices in the driver and meanwhile the losses can be reduced.

BRIEF DESCRIPTION OF THE DRAWINGS

The embodiments of the present application will be described below with reference to the following drawings to facilitate further understanding of the contents disclosed by the present application and the claimed protection scope in claims, and like reference signs refer to like elements throughout the following drawings.

DESCRIPTION OF THE EMBODIMENTS

Embodiments of the present application will be described below in detail. It should be noted that the embodiments described herein are for illustration purposes only but not to limit the present application.

Figure 1:
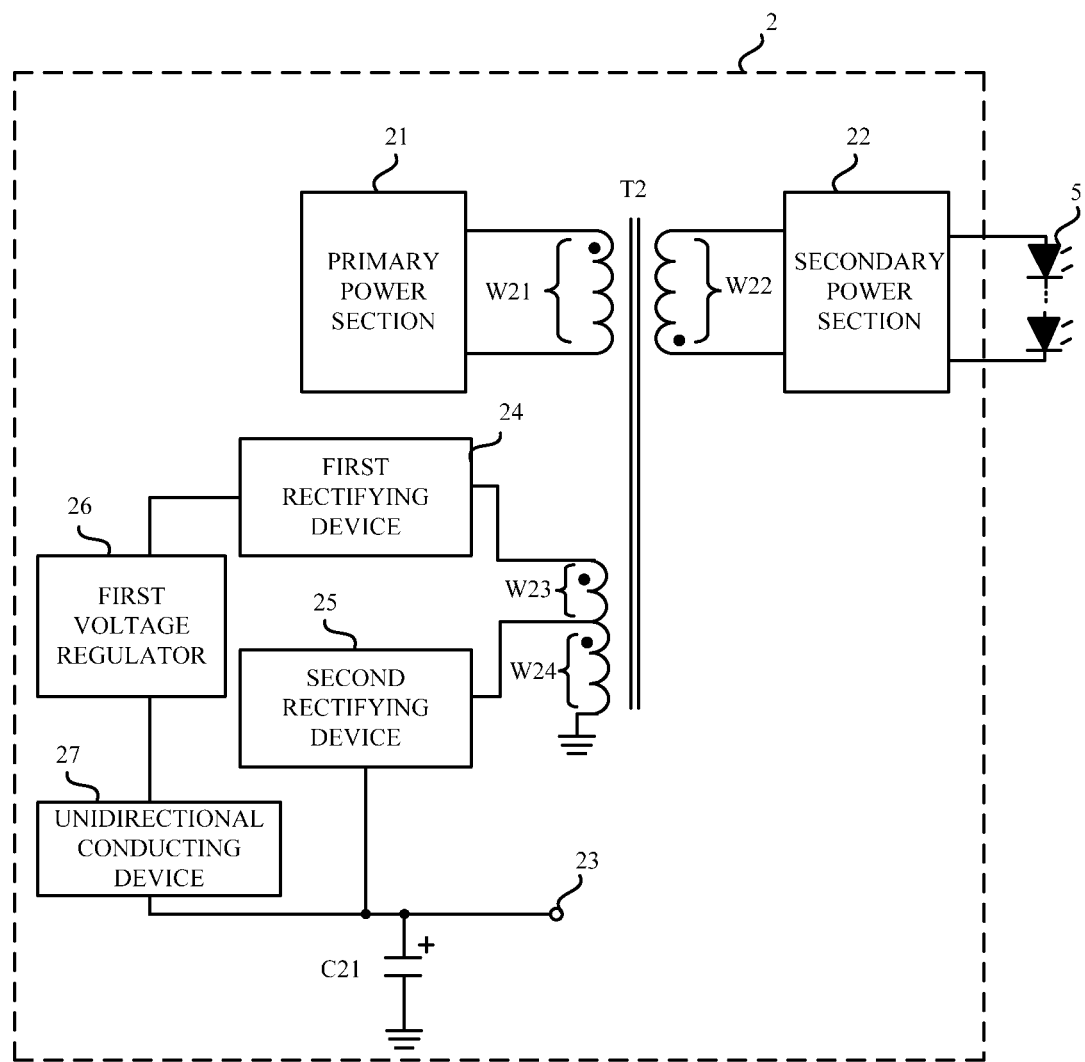
FIG. 1 illustratively shows a circuit block diagram of a LED driver according to an embodiment of the present application.

FIG. 1 illustratively shows a circuit block diagram of a LED driver according to an embodiment of the present application. In the embodiment, a LED driver 2 includes a transformer T2 which includes a primary side winding W21 and a secondary side winding W22. The secondary side winding W22 is configured to be electrically coupled with LED devices 5.

In the LED driver 2, a primary power section 21 and a secondary power section 22 are further included. The primary power section 21 and the secondary power section 22 may be configured in various manners known in this art and thus detailed descriptions thereof are omitted.

The transformer T2 further includes a first auxiliary winding W23 and a second auxiliary winding W24 which are connected in series with each other and have their dotted terminals being consistent with dotted terminal of the primary side winding W21.

The LED driver 2 further includes a first rectifying device 24, a second rectifying device 25, a first voltage regulator 26, an unidirectional conducting device 27 and a DC output terminal 23.

The first rectifying device 24 is electrically coupled with one terminal of the first auxiliary winding W23 while the other terminal thereof is electrically coupled with the second auxiliary winding W24.

The second rectifying device 25 is electrically coupled with one terminal of the second auxiliary winding W24 which is electrically coupled with the first auxiliary winding W23.

The first rectifying device 24 and the second rectifying device 25 may be configured by diodes, or may be configured by other devices having rectifying functions.

The first voltage regulator 26 is electrically coupled with the first rectifying device 24 and is configured to adjust a voltage of an electrical signal rectified by the first rectifying device 24. The first voltage regulator 26 may be configured by various devices having a voltage adjusting function, for example, a Zener diode having a voltage stabilizing function may be used.

A positive terminal of the unidirectional conducting device 27 is electrically coupled with the first voltage regulator 26, and a negative terminal of the unidirectional conducting device 27 is electrically coupled with the second rectifying device 25. For example, the unidirectional conducting device 27 may also be configured by a diode.

The DC output terminal 23 is electrically coupled with the negative terminal of the unidirectional conducting device 27 and is configured to provide required DC electricity to a control circuit (not shown) in the LED driver 2.

The LED driver 2 may further include a filter capacitor C21 which has a first terminal electrically being coupled with the negative terminal of the unidirectional conducting device 27 and a second terminal being grounded.

In the LED driver shown in FIG. 1, the dotted terminals of the two serial-connected auxiliary windings W23 and W24 are consistent with the dotted terminal of the primary side winding W21, and the first voltage regulator 26 is added to control a voltage rectified by the first auxiliary winding W23.

By setting a turns ratio of the first auxiliary winding W23 to the primary side winding W21 and a turns ratio of the second auxiliary winding W24 to the primary side winding W21, the unidirectional conducting device 27 may be turned on or off under different input voltage conditions, so as to make electricity be supplied by the first auxiliary winding W23 only or by the two auxiliary windings W23 and W24 together under different input voltage conditions. Thus, the Vcc voltage provided under different input voltage conditions can always meet the DC power supplying requirements of respective control devices in the driver and meanwhile the losses can be reduced. Furthermore, the two serial-connected auxiliary windings W23 and W24 are less influenced by the secondary side winding W22 because the dotted terminals of the two serial-connected auxiliary winding W23 and W24 are consistent with the dotted terminal of the primary side winding W21, and thus the provided Vcc voltage can always meet the DC power supplying requirements of respective control devices in the driver regardless of whether the output side is in a heavy load state or a light load state.

Figure 2:
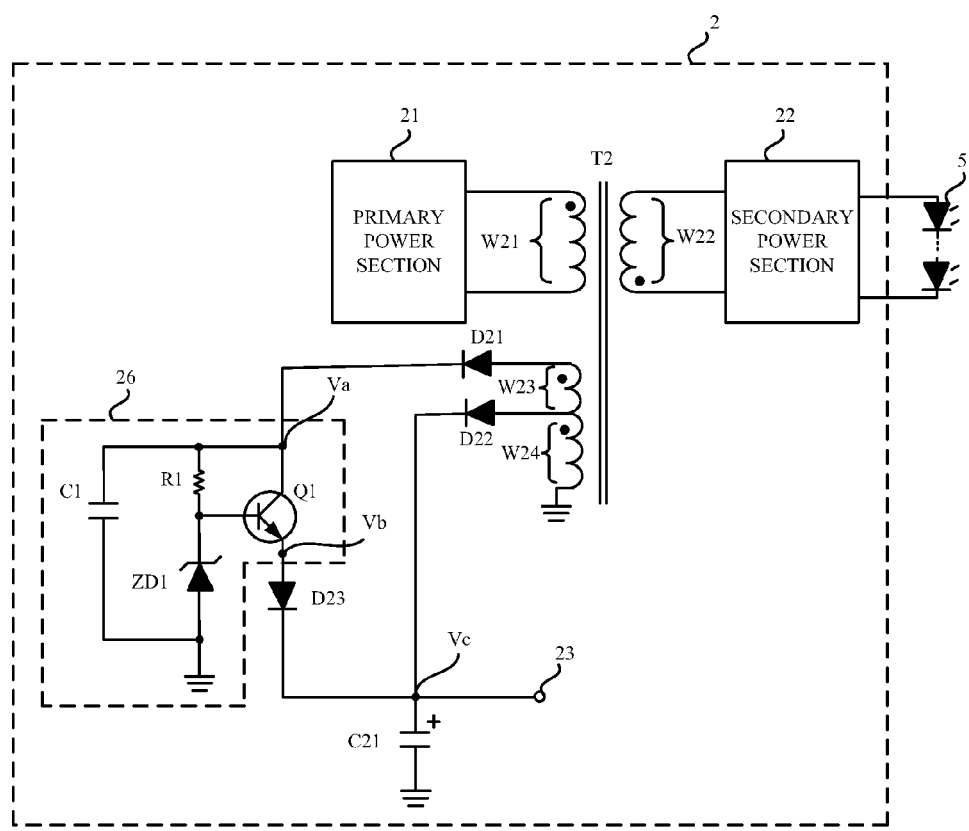
FIG. 2 illustratively shows a circuit block diagram of a LED driver according to another embodiment of the present application.

FIG. 2 illustratively shows a circuit block diagram of a LED driver according to another embodiment of the present application. FIG. 2 is a circuit block diagram obtained by embodying FIG. 1. In FIG. 2, a first diode D21 is configured as the first rectifying device, a second diode D22 is configured as the second rectifying device, and a third diode D23 is configured as the unidirectional conducting device.

According to an embodiment of the present application, the first auxiliary winding W23 and the second auxiliary winding W24 may be formed by adding an intermediate tap into one winding. Also, the first auxiliary winding W23 and the second auxiliary winding W24 may be configured by two single windings, respectively. In FIG. 2, the dotted terminals of the first auxiliary winding W23 and the second auxiliary winding W24 are still consistent with the dotted terminal of the primary side winding W21.

The first voltage regulator 26 in FIG. 2 may include a transistor Q1, a first resistor R1, a Zener diode ZD1 and a capacitor C1.

A first terminal of the transistor Q1 is electrically coupled with the first rectifying device (i.e., the first diode D21), and a second terminal of the transistor Q1 is electrically coupled with the unidirectional conducting device, i.e., it is electrically coupled with an anode of the third diode D23.

A first terminal of the first resistor R1 is electrically coupled with the first rectifying device (i.e., the first diode D21), and a second terminal of the first resistor R1 is electrically coupled with a control terminal of the transistor Q1.

A first terminal of the Zener diode ZD1 is electrically coupled with the second terminal of the first resistor R1, and a second terminal of the Zener diode ZD1 is grounded.

A first terminal of the capacitor C1 is electrically coupled with the first terminal of the first resistor R1, and a second terminal of the capacitor C1 is grounded.

Of course, the voltage regulators involved in the embodiments of the present application may be configured in other structures, and linear voltage regulators are preferably used, but it is not limited to the structure as shown in FIG. 2.

Next, the operating principles of the LED driver in FIG. 2 will be described below.

A voltage Va at a node a is a voltage after rectification of the first diode D21, and the capacitor C21 plays a role of filtering. The transistor Q1, the resistor R1 and the Zener ZD1 play a role of voltage adjustment. A voltage Vb at a node b has a value obtained by subtracting a base voltage of the transistor Q1 from a voltage across the Zener diode ZD1. By choosing resistance value of the resistor R1 and parameters of the Zener diode, the voltage Vb at the node b may be controlled. A voltage Vc at a node c is a voltage after rectification of the second diode D22.

A difference between the LED driver as shown in FIG. 2 and the LED driver in the conventional technologies resides in that the dotted terminals of the two auxiliary windings W23 and W24 are consistent with the dotted terminal of the primary side winding W21 rather than the dotted terminal of the secondary side winding W22. Thus, the output voltage of the auxiliary windings W23 and W24 are influenced by the input voltage of the primary side winding W21, and the wide range changes in the output voltage of the secondary side winding W22 impose less influence on the output voltage of the auxiliary windings W23 and W24.

By choosing a turns ratio of the auxiliary winding W23 to the primary side winding W21 and a turns ratio of the auxiliary winding W24 to the primary side winding W21, the LED driver may satisfy the following conditions.

If the input voltage of the primary side winding W21 is relatively high, then Vb is less than or equal to Vc, the third diode D23 is turned off, and the required DC voltage is provided only by the auxiliary winding W24.

If the input voltage of the primary side winding W21 is relatively low, then Vb is greater than Vc, the third diode D23 is turned on, and the required DC voltage is provided by the auxiliary windings W23 and W24 together.

In the LED driver in FIG. 2, by selectively making only the first auxiliary winding W23 supply electricity or making the first auxiliary winding W23 together with the second auxiliary winding W24 supply electricity according to the input voltage at the primary side winding W21, instead of always making the two auxiliary windings W23 and W24 supply electricity, losses can be reduced.

On the other hand, by selectively making only the first auxiliary winding W23 supply electricity or making the first auxiliary winding W23 together with the second auxiliary winding W24 supply electricity, the DC power supplying requirements of respective control devices in the driver can always be met. For example, the LED driver can avoid a situation where the provided Vcc voltage is less than a required DC voltage of the control devices due to a low input voltage at the primary side winding W21.

Furthermore, the driver as shown in FIG. 2 is less influenced by the secondary side winding W22, and thus the wide range changes in the output voltage of the secondary side winding W22 impose less influence on the auxiliary Vcc power supplying.

Figure 3:
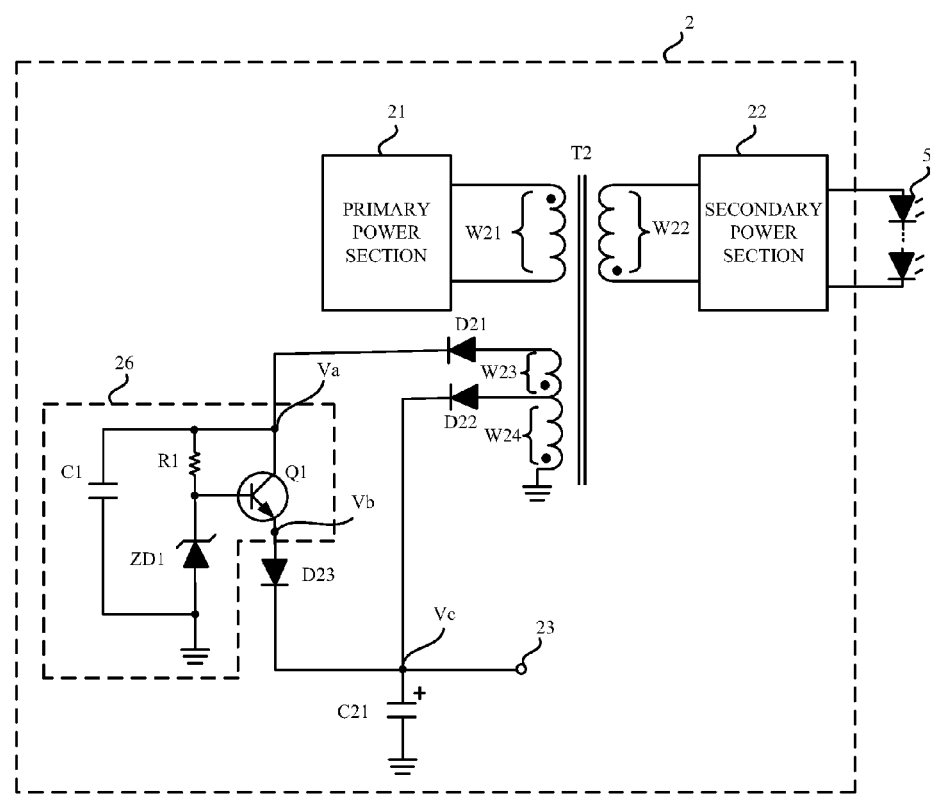
FIG. 3 illustratively shows a circuit block diagram of a LED driver according to another embodiment of the present application.

FIG. 3 illustratively shows a circuit block diagram of a LED driver according to another embodiment of the present application. A difference between this embodiment and the embodiment as shown in FIG. 2 resides in: the dotted terminals of the first auxiliary winding W23 and the second auxiliary winding W24 are consistent with the dotted terminal of the secondary side winding W22 in this embodiment.

The LED driver shown in FIG. 3 has basically similar operating principles as that of the LED driver in FIG. 2. What is slightly different is that the LED driver as shown in FIG. 3 selectively makes only the first auxiliary winding W23 supply electricity or makes the first auxiliary winding 23 together with the second auxiliary winding W24 supply electricity according to the output voltage at the secondary side winding W22 rather than the input voltage at the primary side winding W21.

Specifically, by choosing a turns ratio of the auxiliary winding W23 to the secondary side winding W22 and a turns ratio of the auxiliary winding W24 to the secondary side winding W22, the LED driver may satisfy the following conditions.

If the output voltage of the secondary side winding W22 is relatively high because relatively more LED devices are driven (i.e., the LED driver is under a heavy load state), then Vb is less than or equal to Vc, the third diode D23 is turned off, and the required DC voltage is provided only by the auxiliary winding W24.

If the output voltage of the secondary side winding W22 is relatively low because relatively less LED devices are driven (i.e., the LED driver is under a light load state), then Vb is greater than Vc, the third diode D23 is turned on, and the required DC voltage is provided by the auxiliary winding W23 together with the auxiliary winding W24.

In the LED driver in FIG. 3, by selectively making only the first auxiliary winding W23 supply electricity or making the first auxiliary winding 23 together with the second auxiliary winding W24 supply electricity according to the output voltage at the secondary side winding W22, instead of always making the two auxiliary windings W23 and W24 supply electricity, losses may be reduced, especially the losses under a heavy load state may be reduced.

On the other hand, by selectively making only the first auxiliary winding W23 supply electricity or making the first auxiliary winding 23 together with the second auxiliary winding W24 supply electricity, the DC power supplying requirements of respective control devices in the driver can always be met. For example, the LED driver can avoid a situation where the provided Vcc voltage is less than a required DC voltage of the control devices due to a low output voltage at the secondary side winding W22.

The LED drivers in FIGS. 1 and 3 may be suitable for different application circumstances. Specifically, the LED driver shown in FIG. 1 is preferably suitable for the application circumstance where the changing range of the input voltage of the LED driver is relatively great, because the auxiliary windings W23 and W24 have their dotted terminals being consistent with the dotted terminal of the primary side winding W21. The LED driver shown in FIG. 3 is preferably suitable for the application circumstance where the changing range of the output voltage of the LED driver is relatively great, i.e., preferably suitable for the circumstance where the load of the LED driver has a relatively great variation, because the auxiliary windings W23 and W24 have their dotted terminals being consistent with the dotted terminal of the secondary side winding W22.

It can be seen from the above embodiments that, by setting the turns ratios of the two auxiliary windings to the primary side winding or the turns ratios of the two auxiliary windings to the secondary winding in the embodiments of the present application, a selective power supplying mode of the two auxiliary windings may be achieved, and thus power losses can be reduced and meanwhile Vcc power supplying can be guaranteed.

In summary, under a situation where the dotted terminals of the first auxiliary winding and the second auxiliary winding are consistent with the dotted terminal of the primary side winding, a turns ratio of the first auxiliary winding to the primary side winding and a turns ratios of the second auxiliary winding to the primary side winding are set to be such that:

if an input voltage of the primary side winding is under a first state, the unidirectional conducting device is turned off, wherein the first state is a state where the input voltage is greater than a first preset threshold; and if the input voltage of the primary side winding is under a second state, the unidirectional conducting device is turned on, wherein the second state is a state where the input voltage is less than or equal to the first preset threshold.

The value of the first preset threshold may be determined according to actual conditions of the input voltage at the primary side winding. For example, if the input voltage is within a range from 90 Vac to 305 Vac, the first preset threshold may be set as 198 Vac.

Under a situation where the dotted terminals of the first auxiliary winding and the second auxiliary winding are consistent with the dotted terminal of the secondary side winding, a turns ratio of the first auxiliary winding to the secondary side winding and a turns ratio of the second auxiliary winding to the secondary side winding are set to be such that:

if an output voltage of the secondary side winding is under a third state, the unidirectional conducting device is turned off, wherein the third state is a state where the output voltage of the secondary side winding is greater than a second preset threshold, that is, a heavy load state;

if the output voltage of the secondary side winding is under a fourth state, the unidirectional conducting device is turned on, wherein the fourth state is a state where the output voltage of the secondary side winding is less than or equal to the second preset threshold, that is, a light load state.

The value of the second preset threshold may be determined according to actual conditions of the output voltage at the secondary side winding. For example, if the output voltage is within a range from 0V to 40V, the second preset threshold may be set as 20V.

Figure 4:
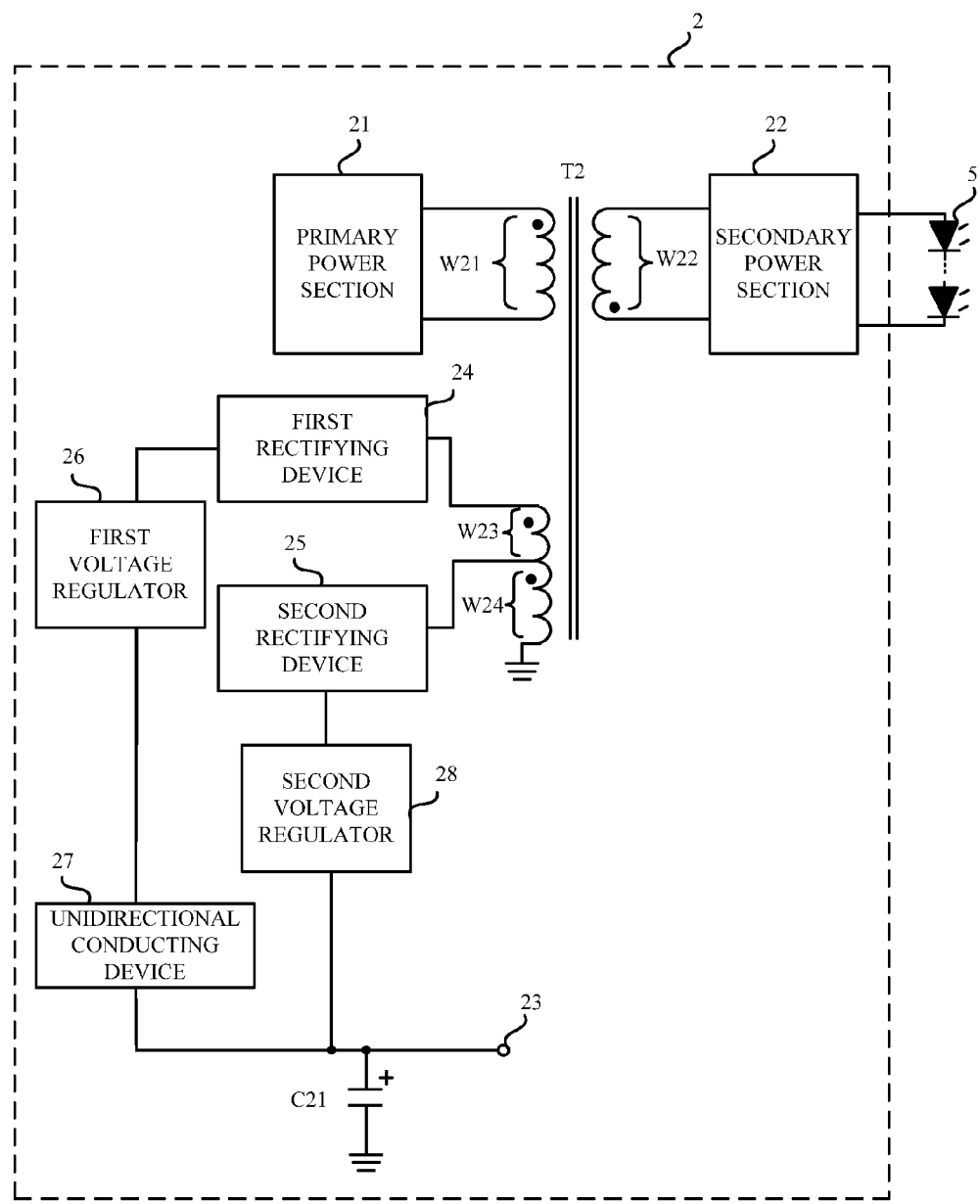
FIG. 4 illustratively shows a circuit block diagram of a LED driver according to another embodiment of the present application.

FIG. 4 illustratively shows a circuit block diagram of a LED driver according to another embodiment of the present application. A difference between this embodiment and the embodiment as shown in FIG. 1 resides in that a second voltage regulator 28 is added. A terminal of the second voltage regulator 28 is electrically coupled with the second rectifying device 24, and the other terminal of the second voltage regulator 28 is electrically coupled with the negative terminal of the unidirectional conducting device 27.

By adding the second voltage regulator, the on and off of the unidirectional conduction device may be controlled more flexibly so as to selectively make the first auxiliary winding W23 and the second auxiliary winding W24 supply Vcc voltage.

Of course, in the embodiments as shown in FIGS. 2 and 3, the second voltage regulator 28 may also be added.

Figure 5:
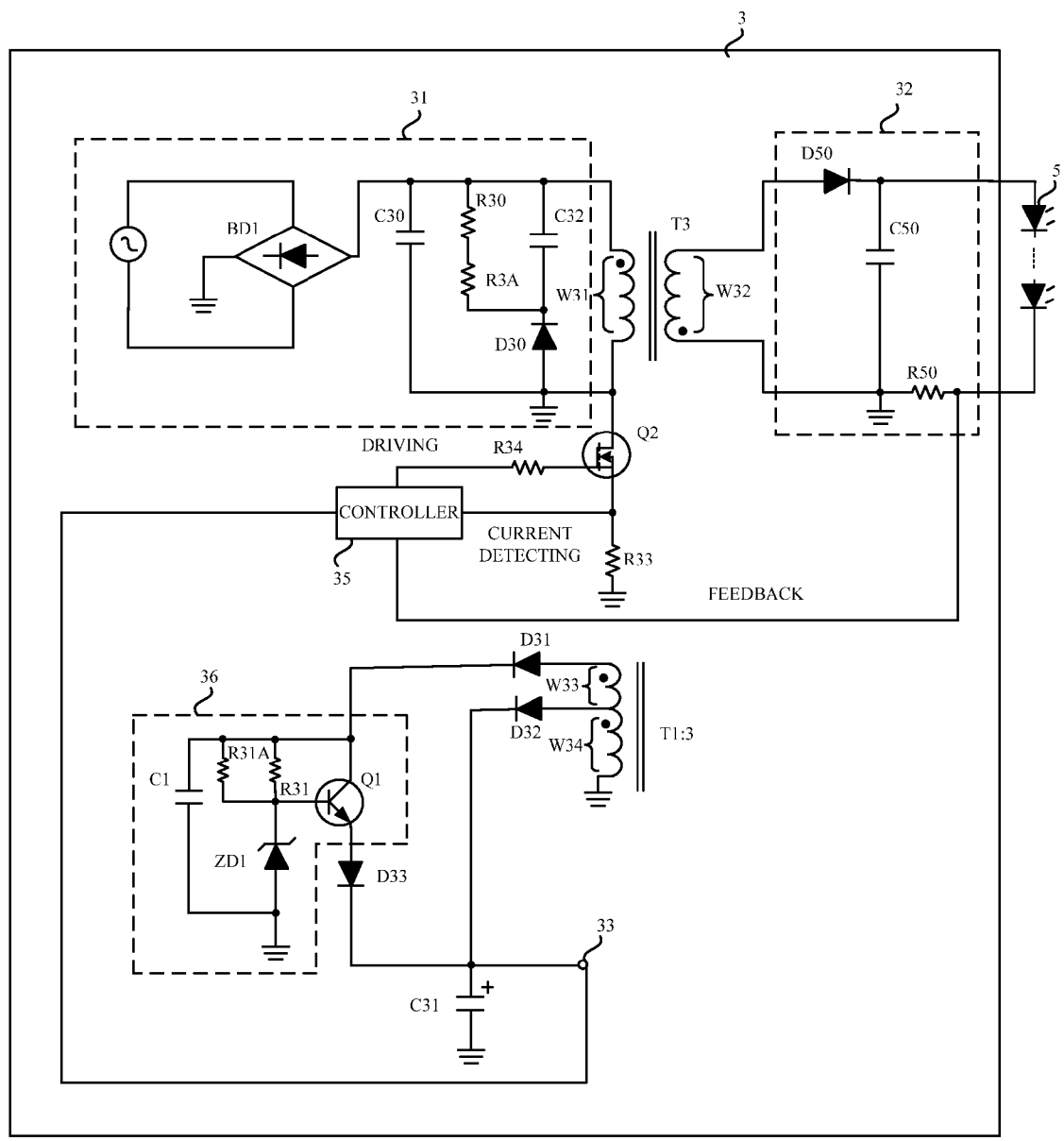
FIG. 5 illustratively shows a circuit block diagram of a LED driver according to another embodiment of the present application.

FIG. 5 illustratively shows a circuit block diagram of a LED driver according to another embodiment of the present application. The LED driver in this embodiment has a structure of flyback type.

The LED driver 3 includes a primary power section 31, a secondary power section 32 and a transformer T3. The transformer T3 includes a primary side winding W31 and a secondary side winding W32.

The number of the LED devices 5 driven by the LED driver is variable. The output voltage of the LED driver 3 is within a whole range from 0V to 40V, and the input voltage may be Alternating Current (AC) electricity and may be within a range from 90 Vac to 305 Vac.

In the primary power section 31, the input AC electricity flows through a rectifier bridge BD1 and then enters into an input capacitor C30. A transistor Q2 serves as a main switch in the flyback structure. A diode D30, a capacitor C32, a resistor R30, a resistor R3A constitute a circuit to clamp the energy of the leakage inductance at the primary side so as to prevent the peak voltage across the transistor Q2 from being over high. A resistor R33 is a sampling resistor and is configured to send a sampled peak current from the primary side to a controller 35.

In the secondary power section 32, a diode D50 serves as a rectifying diode at the secondary side, a capacitor C50 serves as a filter capacitor at the secondary side, and a resistor R50 serves as a sampling resistor at the secondary side and is configured to feed the sampled output current back to the controller 35.

The DC electricity required by chips and control devices is provided by the auxiliary windings. The dotted terminals of the first auxiliary winding W33 and the second auxiliary winding W34 are consistent with the dotted terminal of the primary side winding W31. A diode D31, resistors R3A and R31, a capacitor C1, a Zener diode ZD1, a transistor Q1 and a diode D33 constitute a rectifying circuit when the electricity is supplied by the first auxiliary winding W33 together with the second auxiliary winding W34. The stabilizing voltage of the Zener diode ZD1 is 16V, for example.

Figure 6:
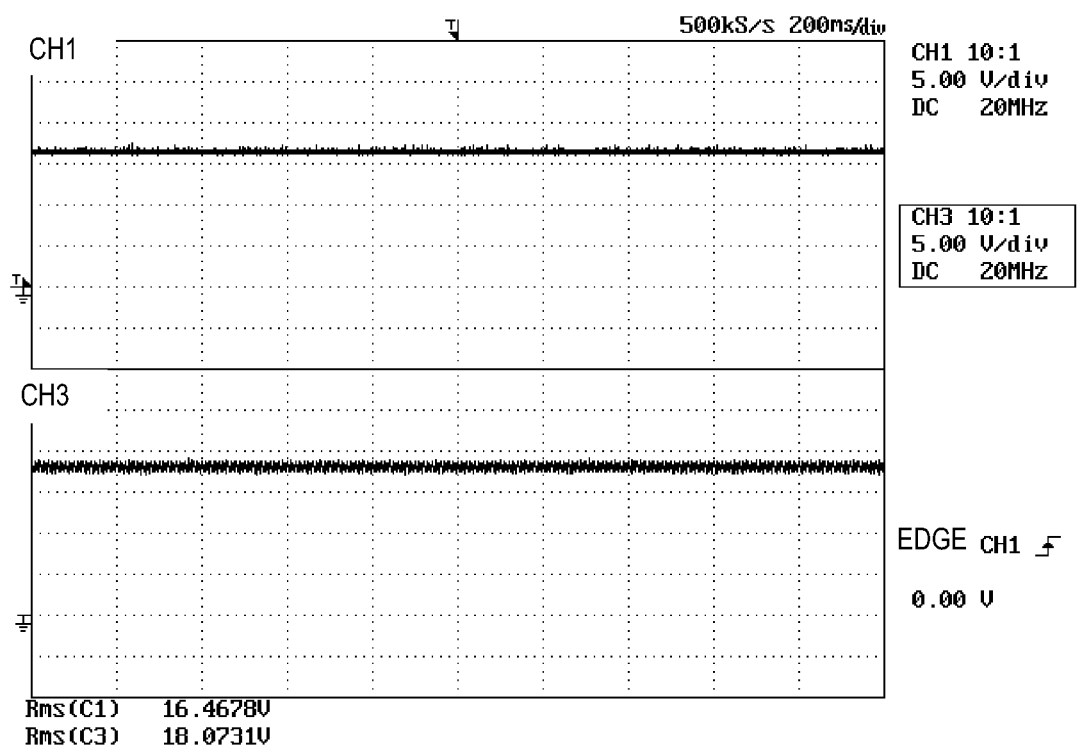
FIG. 6 illustratively shows experimental measurement results when an input voltage of the LED driver as shown in FIG. 5 is 277 Vac.

When the input voltage is relatively high, for example, 277 Vac, only the second auxiliary winding W34 supplies electricity. The voltage across the second auxiliary winding W34, after rectification of the second diode D32 and filtering of the capacitor C31, is already higher than the voltage across the Zener diode by about 1.6V. FIG. 6 illustratively shows experimental measurement results when an input voltage of the LED driver as shown in FIG. 5 is 277 Vac. Channel CH1 represents the voltage across the Zener diode ZD1, i.e., the base voltage of the transistor Q1. The measured voltage value at Channel CH1 in FIG. 6 is 16.46780V in Root Mean Square (RMS). Channel CH3 represents the voltage across the capacitor C31. The measured voltage value at the channel CH3 in FIG. 6 is 18.0731V in RMS. At this time, the third diode D33 is turned off, there is no load current flowing through the first auxiliary winding W33, and only the second auxiliary winding W34 supplies electricity.

Figure 7:
FIG. 7 illustratively shows experimental measurement results when an input voltage of the LED driver as shown in FIG. 5 is 100 Vac.
Figure 8:
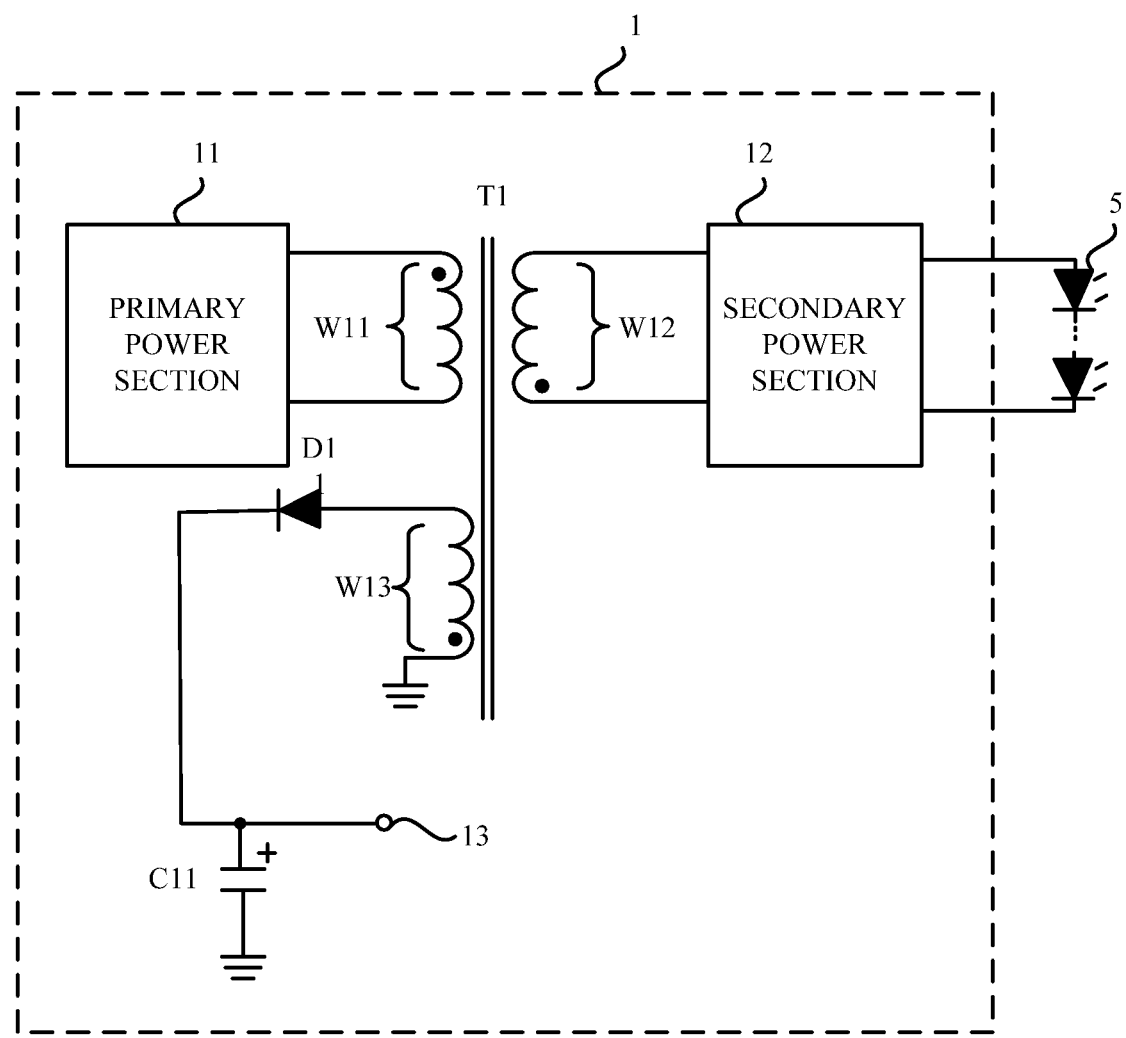
FIG. 8 illustratively shows a schematic diagram of a LED driver having a Vcc auxiliary power supplying circuit in conventional technologies.

When the input voltage is relatively low, for example, 100 Vac, the voltage supplied by the second auxiliary winding is relatively low and the voltage after rectification is lower than the voltage across the Zener diode ZD1. FIG. 7 illustratively shows experimental measurement results when an input voltage of the LED driver as shown in FIG. 5 is 100 Vac. Channel CH1 represents the voltage across the Zener diode ZD1, i.e., the base voltage of the transistor Q1. The measured voltage value at channel CH1 in FIG. 7 is 16.2651V in RMS. Channel CH3 represents the voltage across the capacitor C31. The measured voltage value at the channel CH3 in FIG. 7 is 14.9058V in RMS. At this time, the third diode D33 is turned on, and the electricity required by the controller 35 is supplied by the first auxiliary winding W33 together with the secondary winding W34.

Thus, when the input voltage is relatively high, making only the second auxiliary winding W34 supply electricity can effectively reduce losses; when the input voltage is relatively low, supplying electricity with the two auxiliary windings together can guarantee that the provided Vcc voltage is sufficiently high and thereby the power supplying requirements of the controller 35 can be met so as to make the chip operate normally. No matter how many LED devices are driven, the circuit can be guaranteed in normal operation.

It should be noted that, the LED drivers in respective embodiments of the present application can have various structures without being limited to the flyback structure as shown in FIG. 5. For example, the LED drivers may have a Boost structure, a Buck structure, and so on.

Although the present invention has been described with reference to typical embodiments, it should be understood that the terminologies herein are for illustration purposes rather than to limit the present invention. The present invention can be implemented in many specific embodiments without departing from the spirit and scope of the present invention, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. An LED driver comprising:
a transformer comprising a primary side winding and a secondary side winding, the secondary side winding being configured to be electrically coupled with a LED device;
the LED driver further comprising:
a first auxiliary winding and a second auxiliary winding which are connected in series with each other and have their dotted terminals being consistent with a dotted terminal of the primary side winding or the secondary side winding;
a first rectifying device electrically coupled with a terminal of the first auxiliary winding while the other terminal of the first auxiliary winding is electrically coupled with the second auxiliary winding;
a second rectifying device electrically coupled with a terminal of the second auxiliary winding which is electrically coupled with the first auxiliary winding;
a first voltage regulator electrically coupled with the first rectifying device and configured to adjust a voltage of an electrical signal rectified by the first rectifying device;
a unidirectional conducting device having a positive terminal electrically coupled with the first voltage regulator and a negative terminal electrically coupled with the second rectifying device; and
a DC output terminal electrically coupled with the negative terminal of the unidirectional conducting device and configured to provide required DC electricity to a control circuit in the LED driver,
wherein the first voltage regulator comprises:
a transistor having a first terminal electrically coupled with the first rectifying device and a second terminal electrically coupled with the unidirectional conducting device;
a first resistor having a first terminal electrically coupled with the first rectifying device and a second terminal electrically coupled with a control terminal of the transistor;
a Zener diode having a first terminal electrically coupled with the second terminal of the first resistor and a second terminal being grounded; and
a capacitor having a first terminal electrically coupled with the first terminal of the first resistor and a second terminal being grounded.

2. The LED driver according to claim 1, wherein the first auxiliary winding and the second auxiliary winding are formed by adding an intermediate tap into one winding.

3. The LED driver according to claim 1, wherein the first auxiliary winding and the second auxiliary winding are formed by two single windings, respectively.

4. The LED driver according to claim 1, wherein under a situation where the dotted terminals of the first auxiliary winding and the second auxiliary winding are consistent with the dotted terminal of the primary side winding, a turns ratio of the first auxiliary winding to the primary side winding and a turns ratio of the second auxiliary winding to the primary side winding are set to be such that:
if an input voltage of the primary side winding is under a first state, the unidirectional conducting device is turned off, the first state being a state in which the input voltage is greater than a first preset threshold; and
if the input voltage of the primary side winding is under a second state, the unidirectional conducting device is turned on, the second state being a state in which the input voltage is less than or equal to the first preset threshold.

5. The LED driver according to claim 1, wherein under a situation where the dotted terminals of the first auxiliary winding and the second auxiliary winding are consistent with the dotted terminal of the secondary side winding, a turns ratio of the first auxiliary winding to the secondary side winding and a turns ratio of the second auxiliary winding to the secondary side winding are set to be such that:
if an output voltage of the secondary side winding is under a third state, the unidirectional conducting device is turned off, the third state being a state in which the output voltage of the secondary side winding is greater than a second preset threshold; and
if the output voltage of the secondary side winding is under a fourth state, the unidirectional conducting device is turned on, the fourth state being a state in which the output voltage of the secondary side winding is less than or equal to the second preset threshold.

6. The LED driver according to claim 1, wherein the first rectifying device is formed by a first diode and the second rectifying device is formed by a second diode.

7. The LED driver according to claim 6, wherein the unidirectional conducting device is formed by a third diode.

8. The LED driver according to claim 7, further comprising a second voltage regulator having a first terminal electrically coupled with the second rectifying device and a second terminal electrically coupled with the negative terminal of the unidirectional conducting device.

9. The LED driver according to claim 8, further comprising a filter capacitor having a first terminal electrically coupled with the negative terminal of the unidirectional conducting device and a second terminal being grounded.

* * * * *